United States Patent
Fournet

(10) Patent No.: US 11,954,798 B2
(45) Date of Patent: Apr. 9, 2024

(54) AUTOMATIC SELECTION OF A REGION IN A THREE-DIMENSIONAL (3D) POINT CLOUD

(71) Applicant: FARO Technologies, Inc., Lake Mary, FL (US)

(72) Inventor: Romain Fournet, Montreal (CA)

(73) Assignee: FARO Technologies, Inc., Lake Mary, FL (US)

( * ) Notice: Subject to any disclaimer, the term of this patent is extended or adjusted under 35 U.S.C. 154(b) by 60 days.

(21) Appl. No.: 17/584,613

(22) Filed: Jan. 26, 2022

(65) Prior Publication Data

US 2022/0343600 A1    Oct. 27, 2022

Related U.S. Application Data

(60) Provisional application No. 63/178,020, filed on Apr. 22, 2021.

(51) Int. Cl.
*G06T 17/20* (2006.01)
*G06T 7/60* (2017.01)
*G06T 7/90* (2017.01)

(52) U.S. Cl.
CPC ............... *G06T 17/20* (2013.01); *G06T 7/60* (2013.01); *G06T 7/90* (2017.01); *G06T 2207/10028* (2013.01); *G06T 2207/20092* (2013.01)

(58) Field of Classification Search
None
See application file for complete search history.

(56) References Cited

U.S. PATENT DOCUMENTS

| 6,542,249 B1* | 4/2003 | Kofman ............. G01B 11/2513 356/601 |
| 8,705,012 B2 | 4/2014 | Greiner et al. |
| 11,361,508 B2* | 6/2022 | Cheng .................. G06T 19/006 |
| 2012/0163672 A1* | 6/2012 | McKinnon .............. G06T 7/593 382/106 |

(Continued)

OTHER PUBLICATIONS

Sareen et al. "Hierarchical data clustering approach for segmenting colored three-dimensional point clouds of building interiors;" 11 pages; SPIE; Optical Engineering 50(7), 077003 (Jul. 2011) (Year: 2011).*

(Continued)

*Primary Examiner* — Edward Martello
(74) *Attorney, Agent, or Firm* — McCarter & English, LLP

(57) ABSTRACT

Automatic selection of region in 3D point cloud is provided. Neighbor points are determined for given seed point of seed points. Responsive to a color difference of a given neighbor point from given seed point being less than neighbor color distance threshold and responsive to an angle between a normal of given neighbor point and a normal of given seed point being less than neighbor normal angle threshold, given neighbor point is added to region in 3D point cloud. Responsive to curvature at given neighbor point being less than curvature threshold, responsive to color difference of given neighbor point from initial seed point being less than initial seed color distance threshold and responsive to an angle between a normal of given neighbor point and a normal of initial seed point being less than an initial seed normal angle, given neighbor point is added to seed points for processing.

20 Claims, 15 Drawing Sheets

(56) References Cited

U.S. PATENT DOCUMENTS

| | | | | |
|---|---|---|---|---|
| 2013/0096886 A1* | 4/2013 | Vorobyov | ............... | G01C 11/00 |
| | | | | 703/1 |
| 2013/0266223 A1* | 10/2013 | Zhang | ...................... | G06T 7/187 |
| | | | | 382/173 |
| 2015/0098623 A1* | 4/2015 | Shimizu | ................. | G06T 3/4038 |
| | | | | 382/104 |
| 2015/0317821 A1* | 11/2015 | Ding | ........................ | G06T 7/11 |
| | | | | 345/420 |
| 2016/0098845 A1* | 4/2016 | Ameline | .................... | G06T 5/30 |
| | | | | 345/611 |
| 2018/0304468 A1* | 10/2018 | Holz | ........................ | B66F 9/063 |
| 2020/0082207 A1* | 3/2020 | Xie | ........................ | G01S 7/4802 |

OTHER PUBLICATIONS

Zhan, Qingming, Liang Yu, and Yubing Liang. "A point cloud segmentation method based on vector estimation and color clustering." The 2nd International Conference on Information Science and Engineering. IEEE, 2010. (Year: 2010).*

Teng, CH., Chuo, KY. & Hsieh, CY. Reconstructing three-dimensional models of objects using a Kinect sensor. The Visual Computer 34, 1507-1523 (2018). (Year: 2018).*

Wesolkowski et al.; "Global color image segmentation strategies: Euclidean distance vs. vector angle;" Neural Networks for Signal Processing IX: Proceedings of the 1999 IEEE Signal Processing Society Workshop , pp. 419-428 (Year: 1999).*

Sanda Mahama et al.; "Choice of distance metrics for RGB color image analysis;" IS&T International Symposium on Electronic Imaging 2016 Color Imaging XXI: Displaying, Processing, Hardcopy, and Applications; Society for Imaging Science and Technology ; 4 pages (Year: 2016).*

Dony et al., "Edge Detection on Color Images Using RGB Vector Angles;" Proceedings of the 1999 IEEE Canadian Conference on Electrical and Computer Engineering, Shaw Conference Center, Edmonton, Alberta, Canada; May 9-12, 1999; pp. 687-692 (Year: 1999).*

Rabbania, "Segmentation of Point Clouds Using Smoothness Constraint"; ISPRS Commission V Symposium 'Image Engineering and Vision Metrology, vol. XXXVI, Part 5, Dresden Sep. 25-27, 2006; 6 pages.

Schoeler, "Constrained Planar Cuts—Object Partitioning for Point Clouds"; 2015 IEEE Conference on Computer Vision and Pattern Recognition; 9 pages.

Stein; "Object Partitioning using Local Convexity"; Proceedings of the 2014 IEEE Conference on Computer Vision and Pattern Recognition; 8 pages.

Zhan; "Color-Based Segmentation of Point Clouds"; Bretar F, Pierrot-Deseilligny M, Vosselman G (Eds) Laser scanning 2009, IAPRS, vol. XXXVIII, Part 3/W8—Paris, France, Sep. 1-2, 2009; 5 pages.

* cited by examiner

FIG. 8 while {S} is not empty do current seed = last element of {S}
    remove current seed from {S}
    search for 30 nearest neighbors for each of those (previously unchecked) neighbors do if color distance from current seed < rgb_t and angle between the neighbor point's normal and current seed's normal < t, add this neighbor to the region.

if curvature at neighbor point < curv_t and color distance from initial seed < rgb_t0 and angle between the neighbor point's normal and initial seed's normal < t0, add this neighbor to the list of seeds {S}.

return the region.

AUTOMATIC SELECTION OF A REGION IN A THREE-DIMENSIONAL (3D) POINT CLOUD

BACKGROUND

The subject matter disclosed herein relates to the selection of points in a three-dimensional (3D) point cloud, such as that generated by a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D point cloud of data points is formed by the set of three positional coordinates (such as x, y, z) and three color values (such as red, green, blue "RGB"). Processing is generally performed on the 3D point cloud of data points which can include millions of data points. However, some data points may refer to an object in a 3D point cloud and these data points can hold particular significance to a user.

Accordingly, while existing 3D scanners and existing 3D point cloud processing are suitable for their intended purposes, what is needed is a 3D point cloud processing tool having certain features of embodiments disclosed herein.

BRIEF DESCRIPTION

According to one embodiment, a computer-implemented method for automatic selection of a region in a three-dimensional (3D) point cloud is provided. The computer-implemented includes receiving an initial seed point of seed points for creating the region in the 3D point cloud and performing a first process. The first process includes determining neighbor points for a given seed point of the seed points in the 3D point cloud and for each of the neighbor points of the given seed point, performing a second process. The second process includes responsive to a color difference of a given neighbor point from the given seed point being less than a color neighbor distance threshold and responsive to an angle between a normal of the given neighbor point and a normal of the given seed point being less than a neighbor normal angle threshold, adding the given neighbor point to the region in the 3D point cloud. Also, the second process includes responsive to a curvature at the given neighbor point being less than a curvature threshold, responsive to a color difference of the given neighbor point from the initial seed point being less than an initial seed color distance threshold, and responsive to an angle between a normal of the given neighbor point and a normal of the initial seed point being less than an initial seed normal angle threshold, adding the given neighbor point to the seed points in order to perform the first process for the given neighbor having been added.

Other embodiments of the present invention implement features of the above-described method in computer systems and computer program products.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 is an example algorithm for automatic selection of a region in a 3D point according to one or more embodiments;

The detailed description explains embodiments of the invention, together with advantages and features, by way of example with reference to the drawings.

DETAILED DESCRIPTION

The present invention relates to a magic wand tool for three-dimensional (3D) point clouds. One or more embodiments of the invention provide advantages in automatic selection of objects as regions of 3D coordinates in a 3D point cloud. One or more embodiments utilize various thresholds as constraints for automatically selecting a region in the 3D point cloud desired by a user while not selecting other areas in the environment. Accordingly, the automatic selection tool provides an efficient technique for an object in the 3D point cloud to be automatically selected based on the user's initial identification of a (single) data point in the object.

Figure 1:
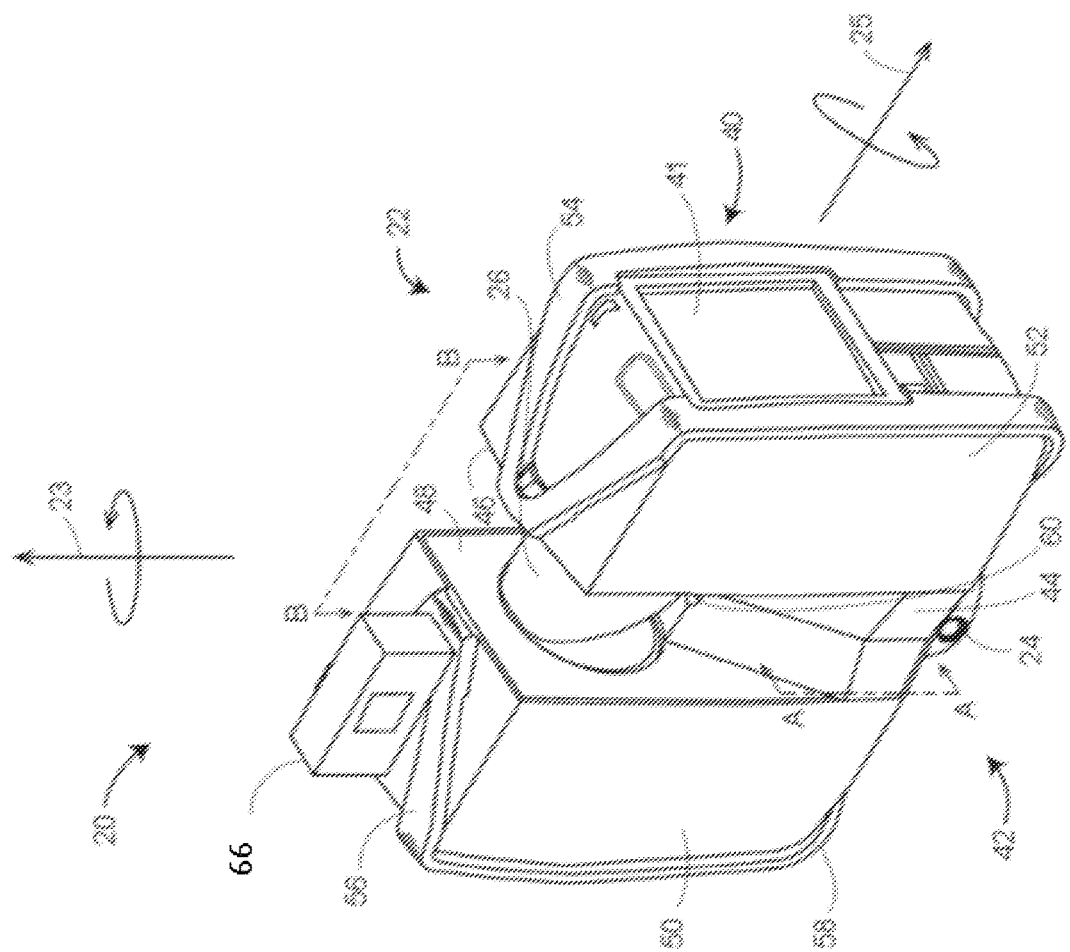
FIG. 1 is a perspective view of a laser scanner in accordance with an embodiment of the invention.
Figure 2:
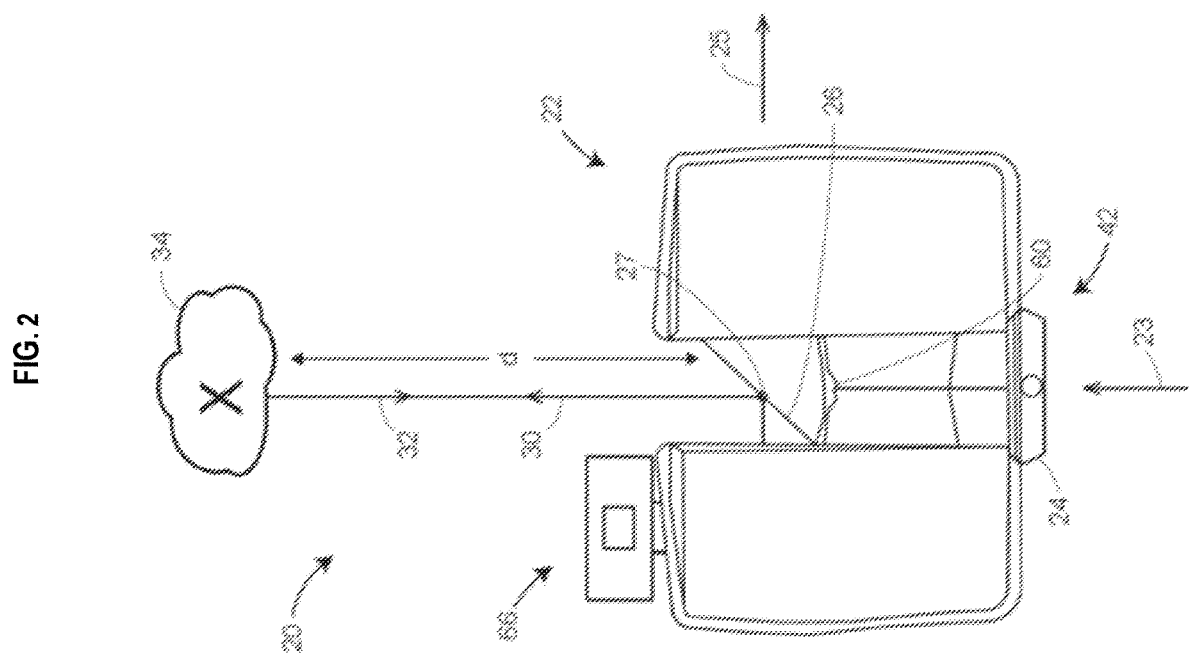
FIG. 2 is a side view of the laser scanner illustrating a method of measurement according to an embodiment.
Figure 3:
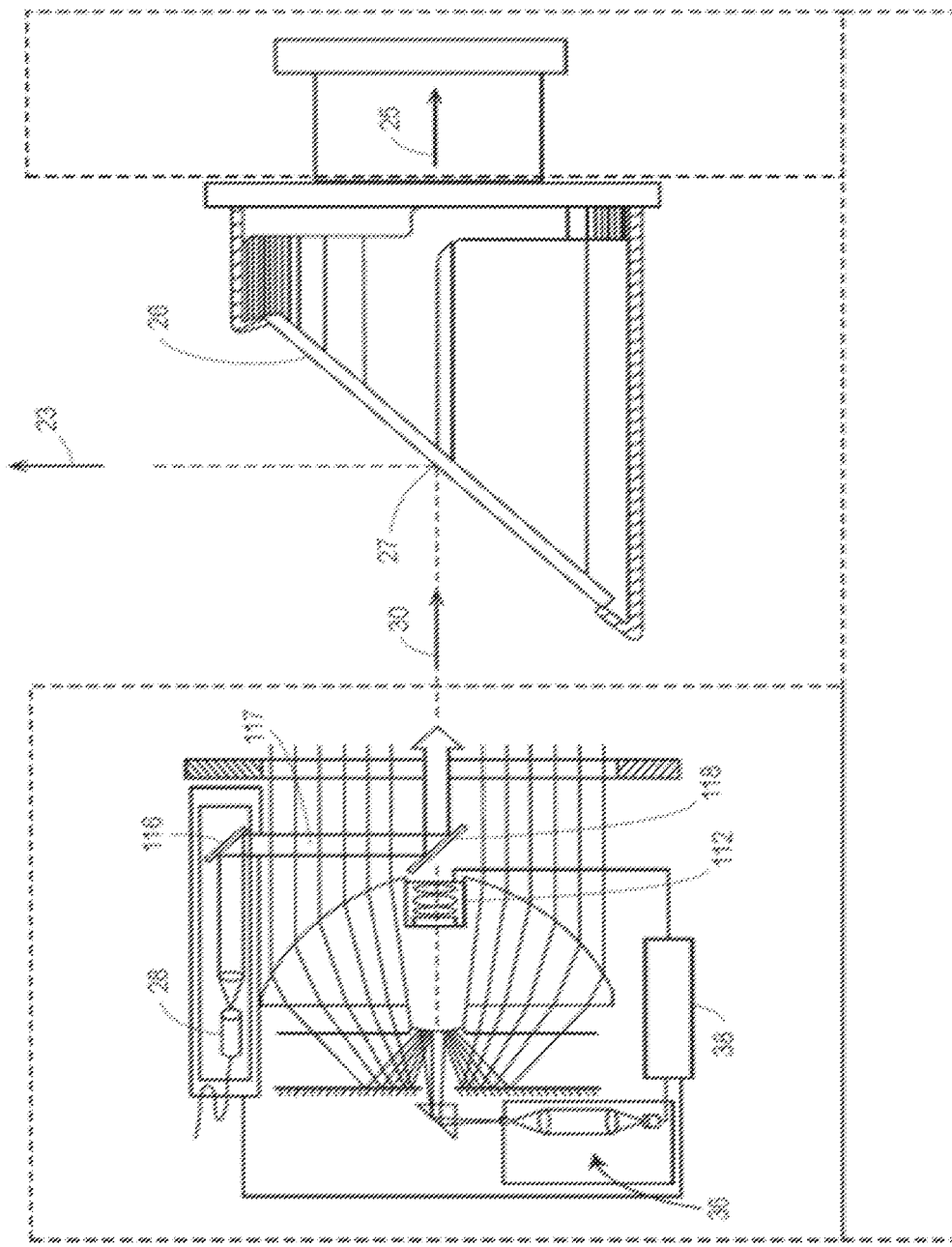
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
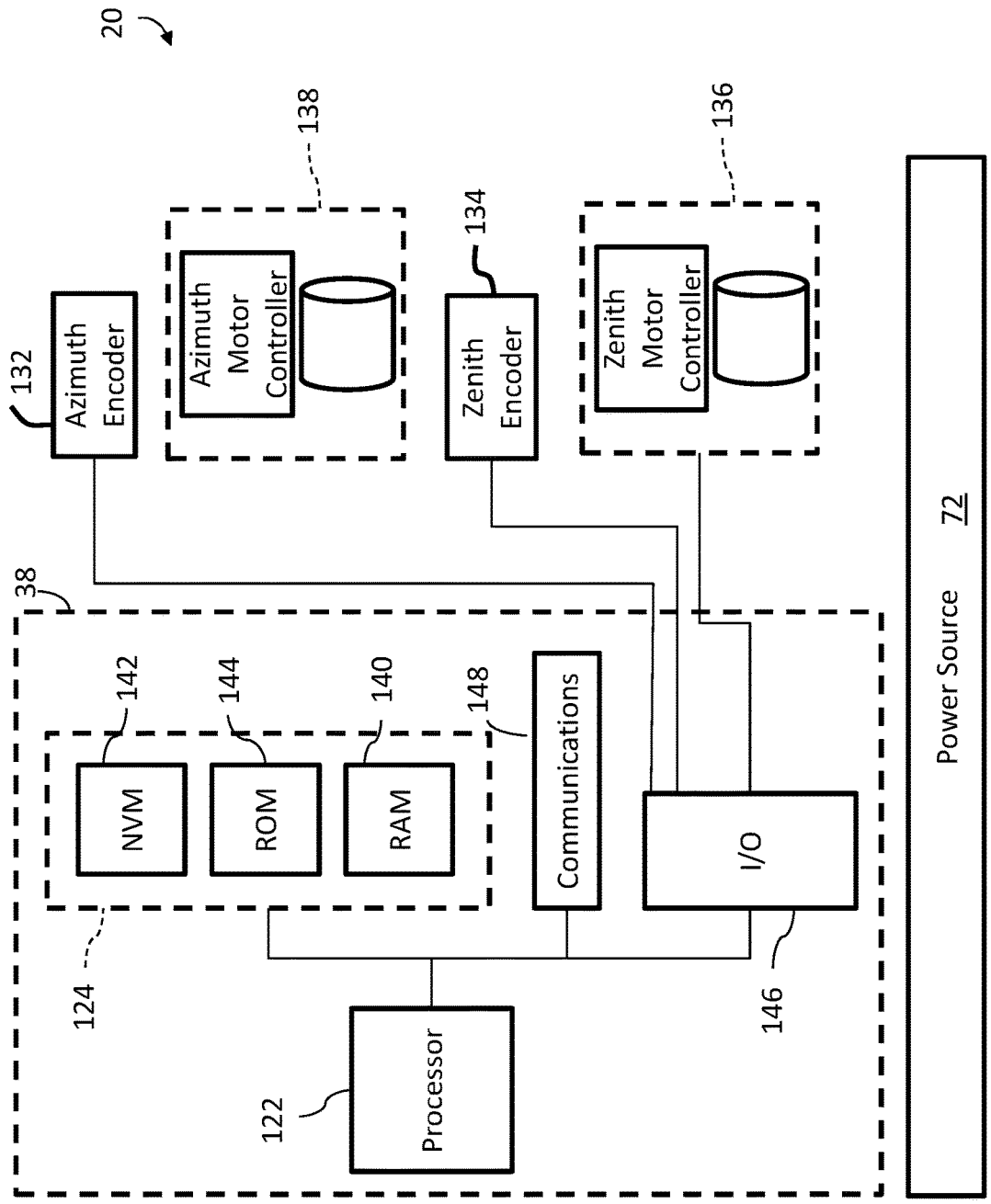
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It should be appreciated that while embodiments herein describe a point cloud that is generated by a TOF scanner, this is for example purposes and the claims should not be so limited. In other embodiments, the point cloud may be generated or created using other types of scanners, such as but not limited to triangulation scanners, area scanners, structured-light scanners, laser line scanners, flying dot scanners, and photogrammetry devices for example.

Figure 5:
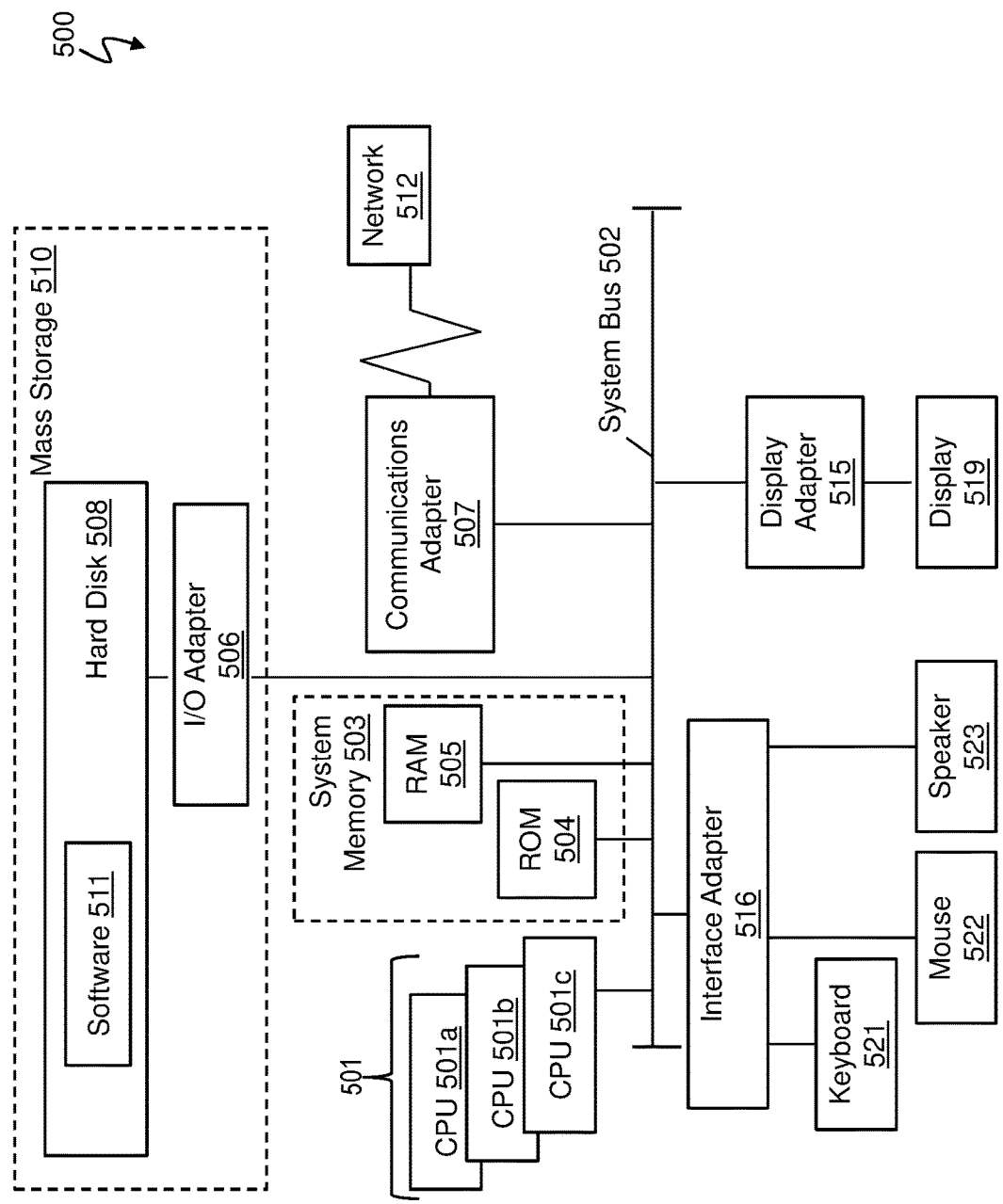
FIG. 5 is a block diagram of an example computer system for use in conjunction with one or more embodiments.

Turning now to FIG. 5, a computer system 500 is generally shown in accordance with one or more embodiments of the invention. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 can be, for example, a server, desktop computer, laptop computer, tablet computer, or smartphone. In some examples, computer system 500 can be a cloud computing node. Computer system 500 can be described in the general context of computer system executable instructions, such as program modules, being executed by a computer system. Generally, program modules can include routines, programs, objects, components, logic, data structures, and so on that perform particular tasks or implement particular abstract data types. Computer system 500 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 5, the computer system 500 has one or more central processing units (CPU(s)) 501a, 501b, 501c, etc., (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and can include a basic input/output system (BIOS) or its successors like Unified Extensible Firmware Interface (UEFI), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 can be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 can be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which can be an outside network, enabling the computer system 500 to communicate with other such systems. In one embodiment, a portion of the system memory 503 and the mass storage 510 collectively store an operating system, which can be any appropriate operating system to coordinate the functions of the various components shown in FIG. 5.

Additional input/output devices are shown as connected to the system bus 502 via a display adapter 515 and an interface adapter 516. In one embodiment, the adapters 506, 507, 515, and 516 can be connected to one or more I/O buses that are connected to the system bus 502 via an intermediate bus bridge (not shown). A display 519 (e.g., a screen or a display monitor) is connected to the system bus 502 by the display adapter 515, which can include a graphics controller to improve the performance of graphics intensive applications and a video controller. A keyboard 521, a mouse 522, a speaker 523, etc., can be interconnected to the system bus 502 via the interface adapter 516, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 can be a cellular network, a radio network, a wide area network (WAN), a local area network (LAN), or the Internet, among others. An external computing device can connect to the computer system 500 through the network 512. In some examples, an external computing device can be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 6:
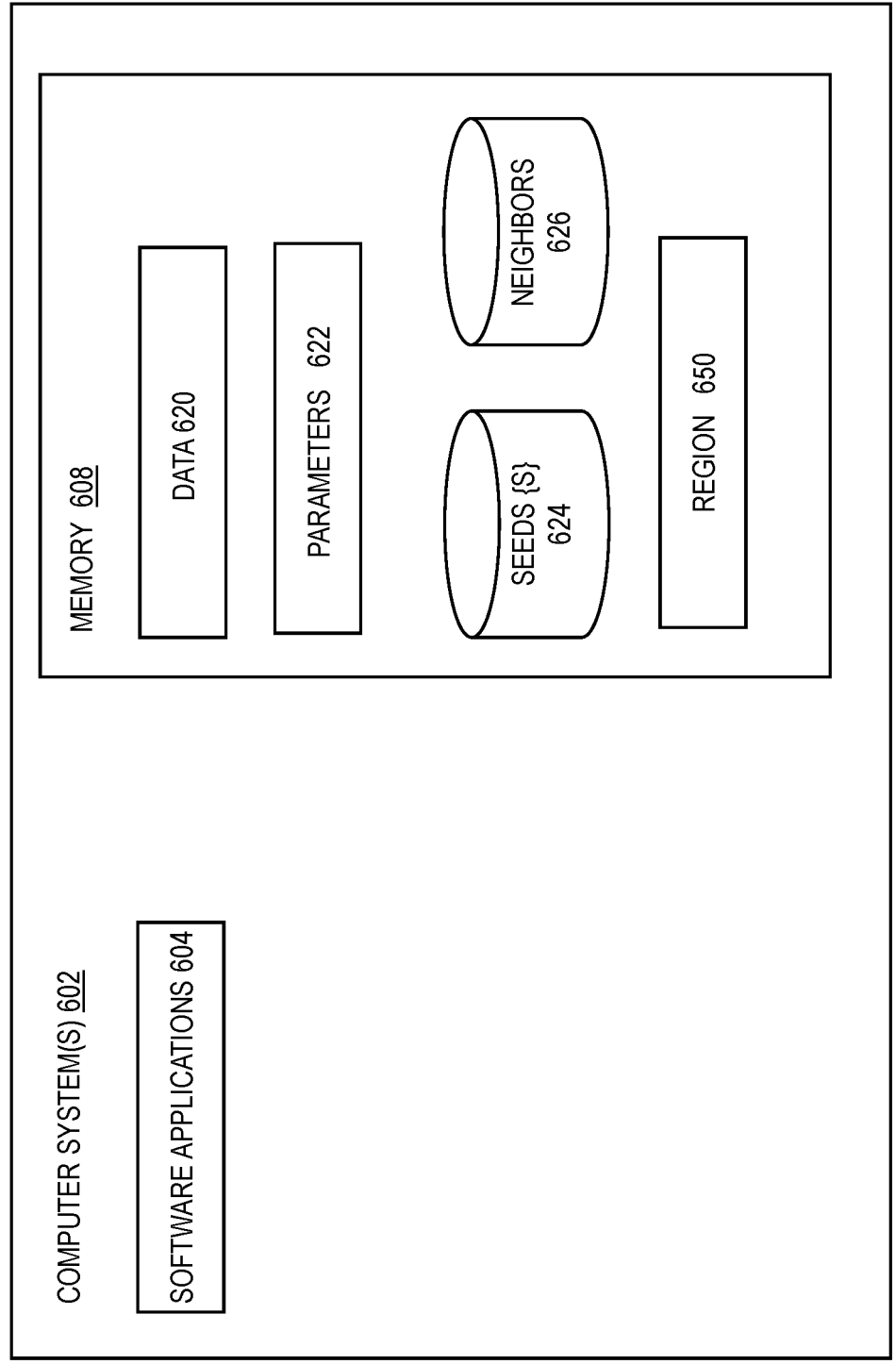
FIG. 6 is a block diagram of a computer system for automatic selection of a region in a three-dimensional (3D) point cloud according to one or more embodiments.

FIG. 6 is a block diagram of a computer system 602 for automatic selection of a region in a three dimensional point cloud according to an embodiment. Elements of computer system 500 may be used in and/or integrated into computer system 602. One or more software applications 604 may be implemented as software 511 executed on one or more processors 501, as discussed in FIG. 5. Data 620 in memory 608 can include a 3D point cloud, also referred to as 3D point cloud data points, 3D point cloud data, point cloud, etc. Data 620 can be generated using laser scanner 20 as discussed in FIGS. 1-4 and/or another suitable three-dimensional coordinate scanning device. Software application 604 can be used with, integrated in, call, and/or be called by other software applications for processing 3D point cloud data as understood by one of ordinary skill in the art. In one or more embodiments, software application 604 can be employed by a user for processing and manipulating 3D point cloud data using a user interface such as, for example, a keyboard, mouse, touch screen, stylus, etc. Software application 604 can include and/or work with a graphical user interface (GUI) and features of software application 604 can be initiated and selected by a user for automatic selection of a desired region 650 in the 3D point cloud as discussed herein.

Software application 604 provides an automatic selection tool for the selection of data points in a 3D point cloud (typically a scan) that share similar properties. Example properties may include properties based on colors, properties based on shape, and/or points delimited by an edge or another discontinuity. It may be recognized that selecting a subset of points from a 3D point cloud can be difficult or frustrating for a user, and this process typically may require the user manually clipping the cloud by navigating in the 3D view and finding the right angles to define clipping planes or may be a rectangle selection. Part of the difficulty is because the image of the 3D point cloud is projected on a two dimensional (2D) screen. However, software application 604 provides a "smart" selection tool with very little user input from the user. In accordance with one or more embodiments, various segmentation techniques can be incorporated and/or combined by software application 604 to implement the automatic tool for the user to select a desired region 650, which may represent a particular object represented by particular 3D data points in the 3D point cloud but not all of the data points. More particularly, software application 604 can use and combine segmentation techniques related to color, smoothness, curvature segmentation, etc., as discussed further herein, according to one or more embodiments. The operation of software application 604 is fast enough for real time operation with 3D point cloud including 100 million data points and possibly more. One reason is because the software application 604 is not required to process all 3D points in the 3D point cloud but only the 3D data points that are checked for meeting the thresholds in parameters 622.

The automatic selection tool of software application 604 will now be described from the user's point of view. Using a user interface, the user may set a number of threshold values in parameters 662 for software application 604 using sliders. The sliders for each threshold can allow for adjustment from a minimum threshold value (such as 0) to a maximum threshold value (such as 100). In one or more embodiments, one or more of the threshold values and/or the set of threshold values may be predetermined and set for the user in advance. Whether set by the user, preset in advance, and/or a combination of both, the threshold values, generally referred to as thresholds, may be stored in parameters 622 for access by software application 604 as noted herein. Parameters 622 can include numerous threshold values associated with software application 604. The thresholds or threshold values refer to parameters and constraints utilized by software application 604 for automatic selection when software application 604 executes an algorithm. The thresholds may initially be at fixed values and displayed to the user. At any point before, during, and/or after automatic selection the user can select and then modify one or more of the thresholds as desired. Using software application 604, the user selects or clicks on a seed point in the 3D view of the software application 604. The seed point is a location on the object for which automatic selection is desired. Based on selection of the seed point, software application 604 is configured to compute the region and computed region 650 is highlighted in the 3D point cloud for display on a display screen such as, for example, display 519. The region 650 may be extended/enlarged by selecting additional seed points from the region using a dedicated button or keyboard shortcut (e.g., control button plus left mouse click (ctrl+left mouse click)). Moreover, two selections may be combined using any Boolean operation for adding, removing, replacing parts, or keeping the intersection of the two selections, using once again a dedicated button or keyboard shortcut. The region 650 can be updated or reset by clicking on a new seed point and/or by sliding the threshold values/parameters in parameters 622 to new values (e.g., smaller values or larger values). The threshold value for each threshold can be independently adjusted.

Figure 7A:
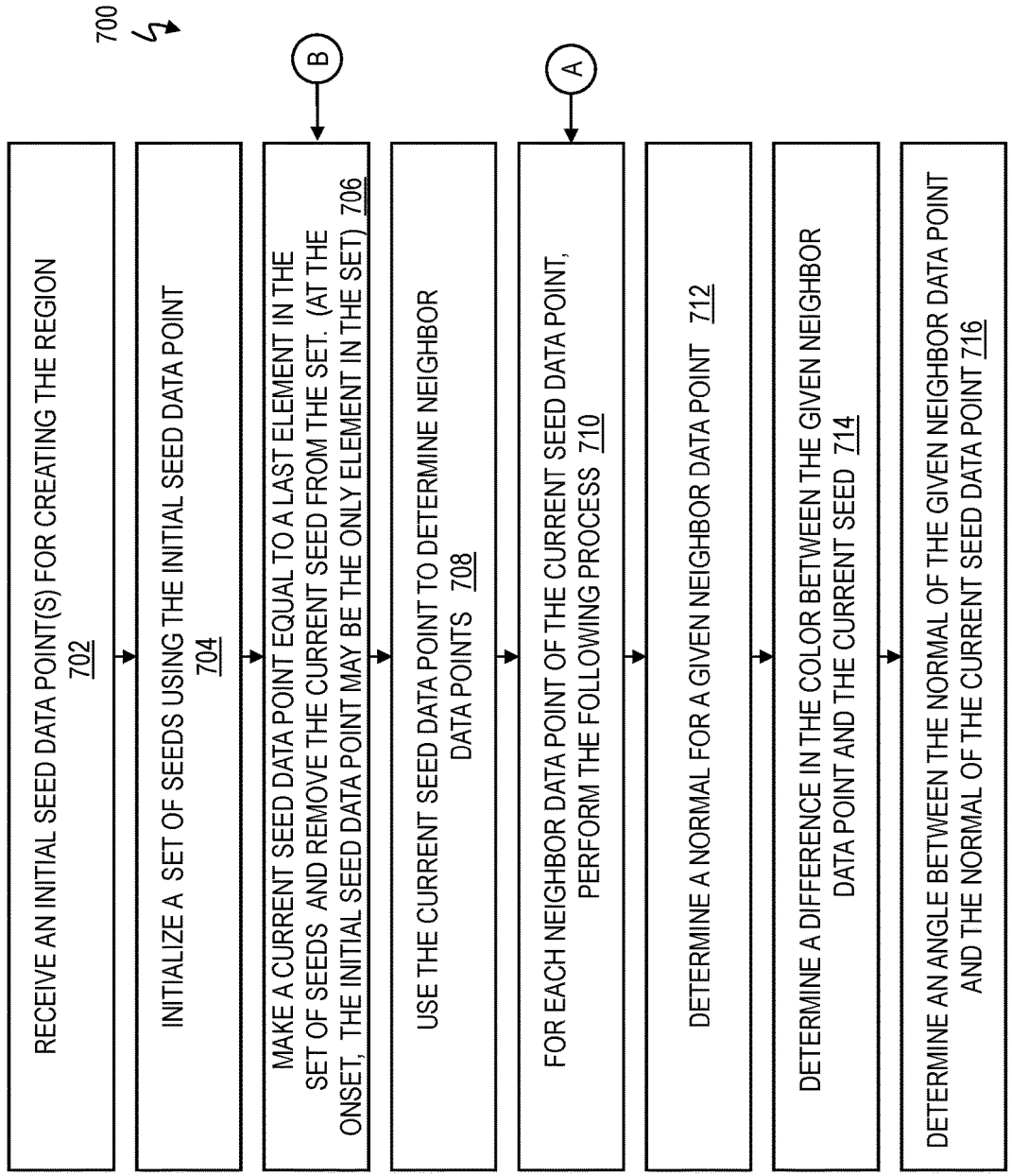
FIGS. 7A and 7B together depict a flow chart of a computer-implemented method for automatic selection of a region in a 3D point according to one or more embodiments.
Figure 7B:
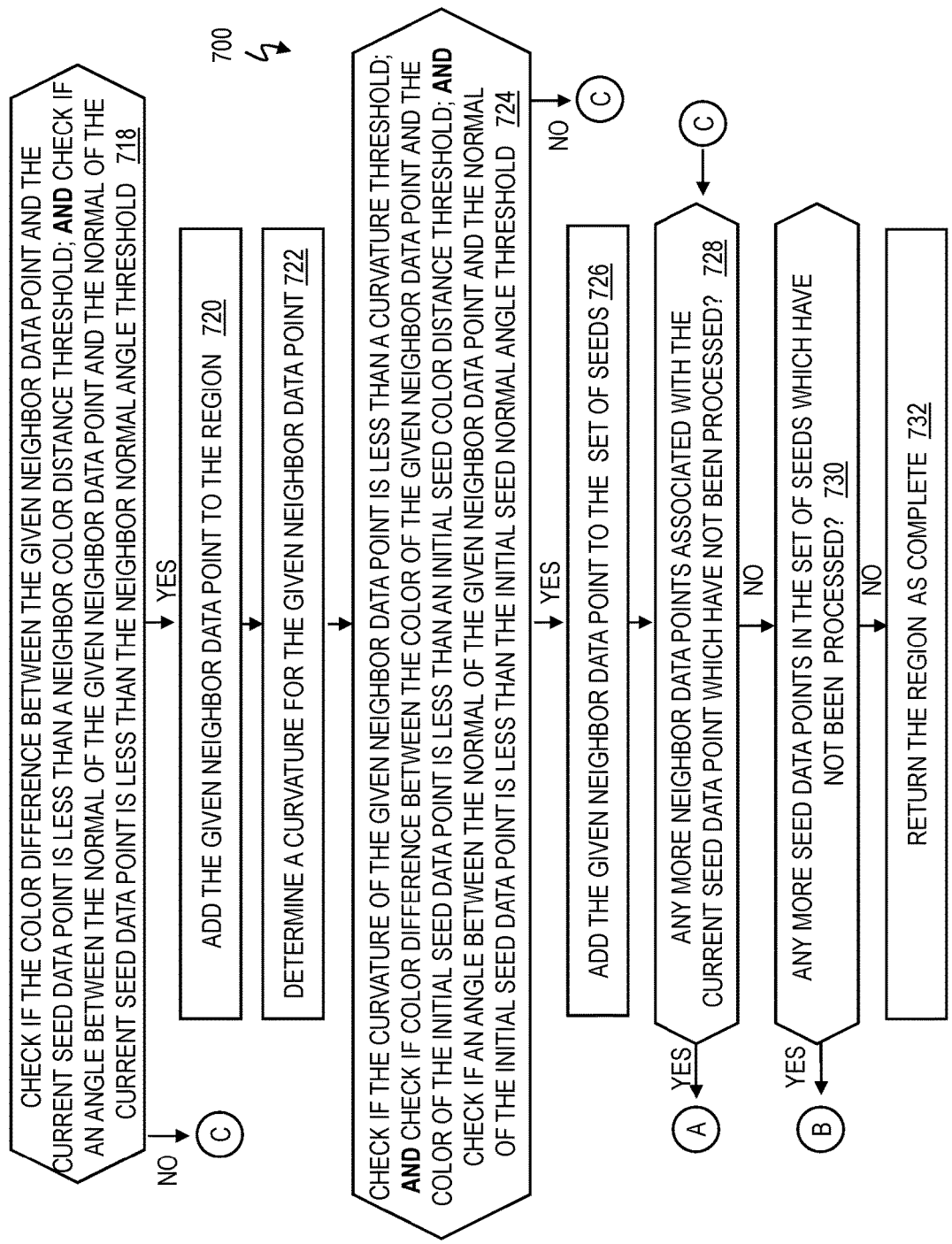

FIGS. 7A and 7B together depict a flow chart of a computer-implemented method 700 for automatic selection of a region in a 3D point according to one or more embodiments. Computer-implemented method 700 may include one or more algorithms executed by software application 604 of computer system 602. Reference will be made to FIGS. 6 and 7. Processing by software application 604 is generally performed on 3D point cloud data which can include millions of 3D data points. Software application 604 can retrieve, process, and/or manipulate data 620 which include the 3D point cloud data. As discussed herein, some data points may refer to the desired object in the 3D point cloud. Software application 604 is configured to automatically select the object as region 650 that the user desires to select for further manipulation and processing. For example, the selection region 650 can be copied, enhanced, removed, etc., as desired by the user. Automatic selection of the region 650 by software application 604 occurs prior to processing to form and/or generate a 3D mesh of the 3D point cloud. A 3D mesh is the structural build of a 3D model consisting of polygons. In general, 3D meshes use reference points in x, y, and z axes to define shapes with height, width, and depth. The 3D mesh uses polygons, typically quadrangles or triangles. The 3D mesh or polygon mesh is a collection of vertices, edges, and faces that defines the shape of a polyhedral object. In contrast to processing used for a 3D mesh, a raw point cloud is devoid of geometrical features, and certain 3D mesh processing would not be applicable to a 3D point cloud.

For the computer-implemented method 700, inputs to software application 604 include: the 3D point cloud (coordinates, normal, and colors), an initial seed index (i.e., initial seed data point), a neighbor normal angle threshold denoted as "t", an initial seed normal angle threshold denoted as "t0", a curvature threshold denoted as "curv_t", an RGB (color) neighbor color threshold denoted as "rgb_t", and an RGB (color) initial seed color difference threshold "rgb_t0". Software application 604 maintains a list/set of seeds {S} or seed data points 624 that are initialized with the single initial seed index.

Now turning to the execution of the computer-implemented method 700 for automatic selection of the region 650, at block 702, software application 604 is configured to receive an initial seed data point for creating a region 650 desired by the user. For example, the user selects and/or clicks on an (single) initial 3D data point in the 3D data point cloud. The selected initial seed data point can be a single 3D data point in the desired object and/or a location that can be represented by at least one 3D data point in the object. At block 704, software application 604 is configured to initialize a set {S} of seed data points 624 using the initial seed data point. The set of seed data points 624 is a structure available to receive more seed data points as discussed herein. At block 706, software application 604 is configured to make/set a current seed data point in the set of seed data points 624 equal to the last element in the set of seed data points 624, and the current seed data point is removed from the set {S}. At the onset, the initial seed data point may be the only element in the set of seed data points 624.

At block 708, software application 604 is configured to use the current seed data point to determine neighbor data points. In one or more embodiments, software application 604 can be configured to search for, for example, 30 nearest neighbors. This may be implemented using a k-dimensional tree (k-d tree) built in advance, which is a data structure suited to perform fast neighbor search. In one or more embodiments, 30 neighbor data points are illustrated but it should be appreciated that fewer or more neighbor data points can be selected. Other example algorithms or techniques for obtaining the nearest neighbors may include octrees, spatial hashing, and other suitable algorithms and techniques. The nearest neighbor data points having been found may be stored in neighbor data points database 626 for further processing, and these stored neighbor data points are associated with the current seed data point. It should be appreciated that each current seed data point will be associated with its own set of neighbor data points in neighbor data points database 626.

At block 710, software application 604 is configured to perform a process for each neighbor data point, and this process may be referred to as the neighbor data point process. The neighbor data point process is described for a given neighbor data point but is repeated for each neighbor data point associated with the current seed data point. At block 712, software application 604 is configured to determine a normal for the given neighbor data point. In one or more embodiments, the normal or normal line for all data points in the 3D point cloud may be determined in advance, and software application 604 is configured to obtain the normal for the given neighbor data point and the current seed data point. The respective normals or normal lines for each data point may be stored in advance in memory 608. Also, software application 604 can determine the normal for the given neighbor data point and the current seed data point during processing. In both cases, the normal of a data point can be determined using suitable techniques. An example of a suitable technique for determining the normal may include local plane fits. At block 714, software application 604 is configured to determine a difference in color (RGB) between the given neighbor data point and the current seed data point. Any suitable technique for color difference may be used. In one or more embodiments, the difference between two colors may be determined using the Euclidian distance between two RGB vectors. One or more embodiments may further weigh R, G, and B values to better fit human perception and their contributions to the brightness of the color. One example could utilize the "redmean" approximation for color difference applied on non-linear standard RGB. At block 716, software application 604 is configured to determine an angle between the normal of the given neighbor data point and the normal of the current seed data point. For example, software application 604 can find the difference between the two normal lines. The difference in normals or normal lines could be a value in degrees, such as 0-180°.

At block 718, software application 604 is configured to perform two checks which include the following: check if the color difference between the given neighbor data point and the current seed data point is less than a neighbor color distance threshold ("rgb_t"), and check if the angle (e.g., absolute value of this difference angle) between the normal of the given neighbor data point and the normal of the current seed data point is less than the neighbor normal angle threshold ("t"). If either check fails (i.e., the answer is "No" for either check) in block 718, flow proceeds to block 728. On the other hand, when the color difference between the given neighbor data point and the current seed data point is less than the neighbor color distance threshold (rgb_t), and when the angle between the normal of the given neighbor data point and the normal of the current seed data point is less than the neighbor normal angle threshold ("t"), software application 604 is configured to add the given neighbor data point to the region 650 at block 720.

At block 722, software application 604 is configured to determine a curvature for the given neighbor data point. In one or more embodiments, the curvature of the given neighbor data point may be determined in advance. The curvature of a data point may be determined using any suitable technique. An example of suitable techniques may include calculating surface variance using covariance analysis, or the "umbrella" curvature. In one or more embodiments, the curvature may be simply approximated by residuals of plane fitting (which can be computed during normal estimation if doing local small plane fits). They may be defined as the point's distance to the local plane fit that may be normalized by the (squared) average distance to its neighbors. Another curvature estimation technique could also be used in the "umbrella" curvature. At block 724, software application 604 is configured to perform three checks which include the following: check if the curvature of the given neighbor data point is less than a curvature threshold ("curv_t"); check if a color difference between the color of the given neighbor data point and the color of the initial seed data point is less than an initial seed color difference threshold ("rgb_t0"); and check if an angle (e.g., absolute value of this difference angle) between the normal of the given neighbor data point and the normal of the initial seed data point is less than the initial seed normal angle threshold ("t0"). The normal of the initial seed data point can be determined during processing and/or determined in advance in preparation for further processing. If any of the three check fails (i.e., the answer is "No" for any one of the three checks) in block 724, flow proceeds to block 728. However, when the curvature of the given neighbor data point is less than a curvature threshold ("curv_t"), when a color difference between the color of the given neighbor data point and the color of the initial seed data point is less than an initial seed color difference threshold ("rgb_t0"), and when the angle between the normal of the given neighbor data point and the normal of the initial seed data point is less than the initial seed normal angle threshold ("t0"), software application 604 is configured to add the given neighbor data point to the set {S} of seed data points 624 at block 726. At block 728, software application 604 is configured to check whether there are any more neighbor data points associated with the current seed data point which have not been processed. If ("Yes") there are more neighbor data points for the current seed data point, flow proceeds to block 710 to continue the loop. If ("No") there are not any more neighbor data points for the current seed data point, flow proceeds to block 730. This concludes the neighbor data point process for a given neighbor data point, and the loop continues for other neighbor data points that have not been processed. At block 730, software application 604 is configured to check if any more seed data points are in the set {S} of seed data points 624 which have not been processed. If ("Yes") there are more seed data points, flow proceeds to block 706. If ("No") there are not any more seed data points that need to be processed, software application 604 is configured to return the region 650 to the user as complete at block 732.

The various thresholds in parameters 622 contribute to automatic selection of region 650. The neighbor (RGB) color distance threshold "rgb_t" ensures that the 3D data points added to the region 650 are connected by their color. The initial seed color (RGB) distance threshold "rgb_t0" is provided to optionally limit the region growth around the initial seed's color, making for a more controlled selection. If the initial seed color (RGB) distance threshold "rgb_t0" (e.g., second threshold) were not utilized, this would will allow the selection of a smooth gradient of color (like red to yellow to green); as such, both options (using and/or not using initial seed color (RGB) distance threshold "rgb_t0") can be useful and made available to the user. Accordingly, software application 604 is configured to provide the user with the option of ignoring the initial seed color (RGB) distance threshold "rgb_t0" in one or more embodiments.

The surface smoothness of the selection is enforced by the use of the neighbor normal angle threshold "t" (neighbor to neighbor). Normal discontinuities will define a cut between two regions and ultimately in the selection. A curvature threshold "curv_t" is used to make sure the smooth areas are broken on the edges (e.g., the smooth areas can be broken where there are high curvature values).

Optionally, the initial seed normal angle threshold "t0" can be used to limit the region 650 to data points having their normal close to the initial seed's normal. This might be considered as a "planar selection ratio". The initial seed normal angle threshold "t0" can be particularly useful on noisy 3D point clouds and/or when curvature (e.g., curvature threshold "curv_t") alone cannot segment objects properly. For instance, for an object laying on the ground, bad scan quality at the transition between the object and the ground may be blurry or incorrectly smooth in the 3D point cloud, which will make the region growing algorithm "leak" on the ground. In other words, part of the ground may be misinterpreted as being part of the object. This type of problem is addressed in one or more embodiments. For example, using the initial seed normal angle threshold "t0" circumvents many problems posed by real life scan data, and the initial seed normal angle threshold "t0" also allows a new kind of selection on already perfectly smooth objects. The initial seed normal angle threshold 't0" will not allow the selection of the front and back of an object in one click, but it often makes for a safer and much more predictable result. Furthermore, the initial seed normal angle threshold "t0" can be tuned very intuitively by a user, because increasing the value enlarges the selection.

In some cases, a user may prefer not to modify the curvature threshold "curv_t" and/or the curvature threshold "curv_t" may not be displayed to the user. As such, the curvature threshold "curv_t" may be hidden from the user and precomputed as a fixed value, such as, for example, the $95^{th}$ percentile of the curvatures of all data points which is a good base for an automatically computed nominal value. Further, the curvature threshold "curv_t" should depend on the nature of the full scan data and the size of its finest details. In some cases, the curvature threshold "curv_t" may be difficult to tune for a non-expert user and may be hidden or even ignored. In one or more embodiments, the curvature threshold "curv_t" could be ignored completely by software application 604 when an initial seed normal angle threshold "t0" is applied, thereby avoiding reliance on the curvature threshold "curv_t".

The color and smoothness constraint may be combined or applied separately, so the user may have to set between 2 and 5 threshold values according to one or more embodiments. Smoothness is enforced by the normal angle and curvature thresholds. Accordingly, the smoothness constraint is a combination of threshold. A color-based selection may be tuned using only the second color threshold (for comparison with the initial seed), the first one being set to a conservative value (such as 10% of the maximum color difference) or any value that would still enforce the smoothness in color of the selection. A smoothness-constraint based selection may be tuned using only the second angle threshold (for comparison with the initial seed), the first one being set to a conservative value (such as 15 degrees) or any value that would still enforce the smoothness in shape of the selection. If the curvature threshold is in fact hidden or ignored (as a possibility discussed herein), the user's interface may be further simplified: the user would only have to set between 1 or 2 threshold values (1 or 2 sliders), increasing those would intuitively enlarge the selection.

FIG. 8 is an example algorithm for automatic selection of a region in a 3D point according to one or more embodiments. FIG. 8 illustrates example loops to determine the region 650, and the exact syntax of FIG. 8 is for explanatory purposes and not limitation. The example code in FIG. 8 can be executed by software application 604 for automatic selection as discussed herein.

Figure 9:
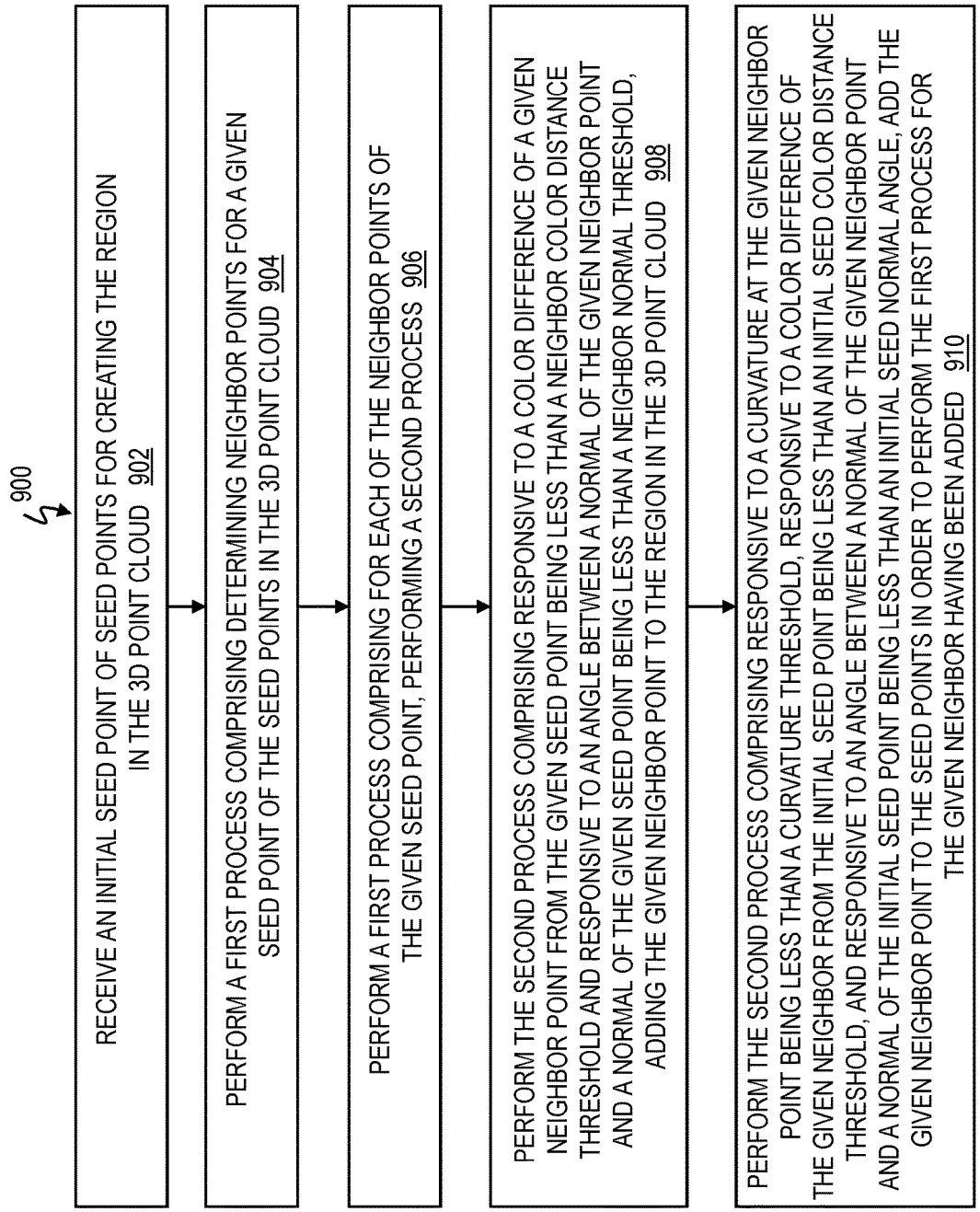
FIG. 9 is a flow chart of a computer-implemented method for automatic selection of a region in a 3D point cloud according to one or more embodiments.

FIG. 9 is a flow chart of a computer-implemented method 900 for automatic selection of a region 650 in a three-dimensional (3D) point cloud according to one or more embodiments. Computer-implemented method 900 can be executed by software application 604 of computer system 602.

At block 902, software application 604 receives an initial seed point of seed points (e.g., the set {S} of seed data points 624) for creating the region 650 in the 3D point cloud (e.g., 3D point cloud data 620). Software application 604 performs a first process. The first process includes determining neighbor points for a given seed point (e.g., the current seed data point) of the seed points in the 3D point cloud at block 904, and for each of the neighbor points of the given seed point, performing a second process at block 906. Software application 604 performs the second process which includes the following. At block 908, responsive to a color difference of a given neighbor point from the given seed point being less than a neighbor color distance threshold and responsive to an angle between a normal of the given neighbor point and a normal of the given seed point being less than a neighbor normal angle threshold, software application 604 adds the given neighbor point to the region in the 3D point cloud. At block 910, responsive to a curvature at the given neighbor point being less than a curvature threshold, responsive to an angle between a normal of the given neighbor point and a normal of the initial seed point being less than an initial seed normal threshold ("t0"), and responsive to a color difference of the given neighbor from the initial seed point being less than an initial seed color difference threshold ("rgb_t0"), software application 604 adds the given neighbor point to the seed points in order to perform the first process for the given neighbor having been added.

In one or more embodiments, the initial seed point is received from user input. Each of the seed points is processed by the first and second processes, the region being complete in response to there being no unprocessed seed points (e.g., in the set {S} of seed data points 624). A number of the neighbor points available for the given seed point is predetermined in advance. The region 650 includes the initial seed point and other points determined/added by performing the first and second processes. Display of the region 650 on a display screen is configured to be distinguished from display of other points in the 3D point cloud which are not part of the region. The first and second processes occur prior to transforming the 3D point cloud into a 3D mesh.

Figure 10:
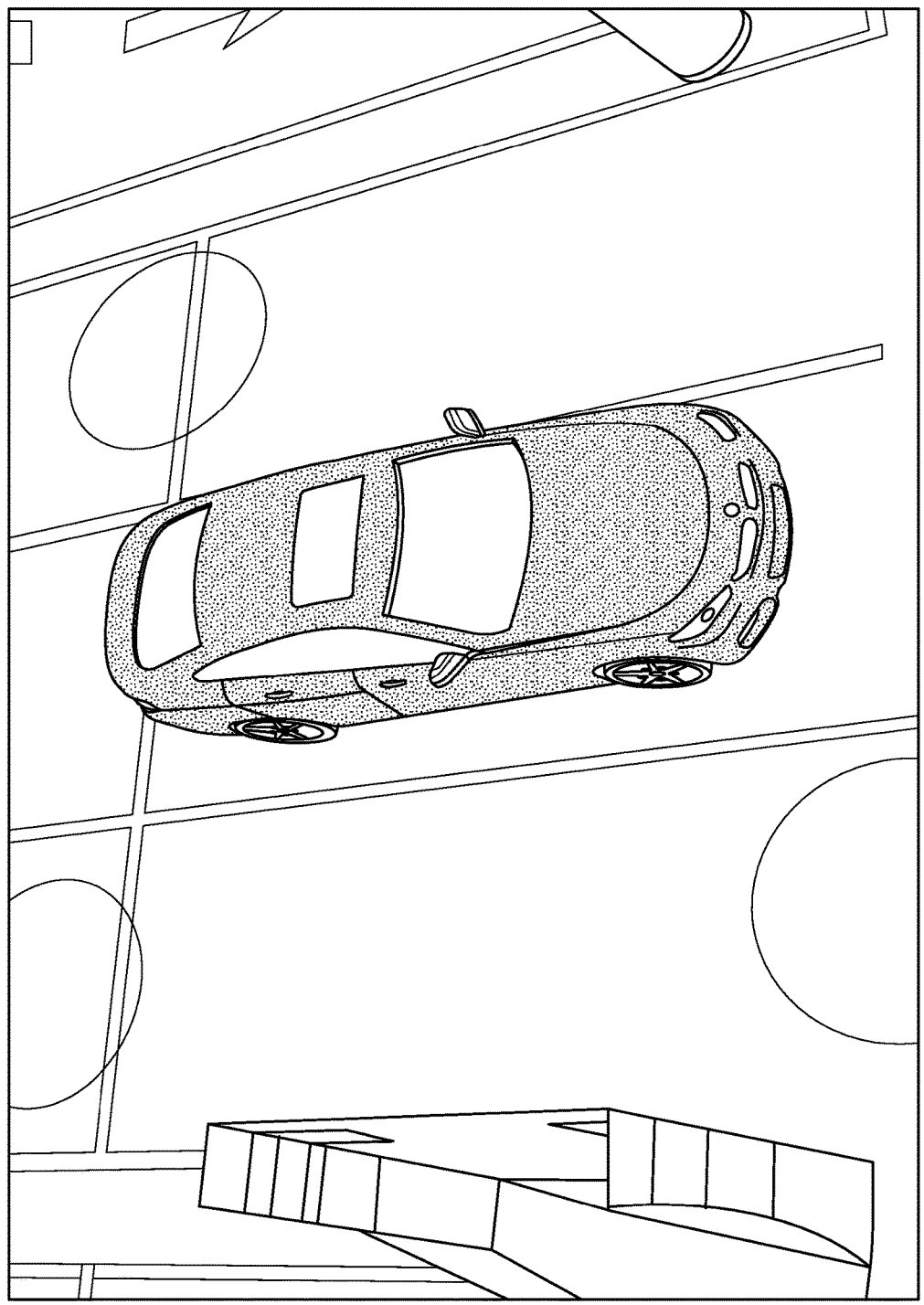
FIG. 10 is an example illustrating automatic selection of the full body of a car according to one or more embodiments.

FIG. 10 is an example illustrating automatic selection of the full body of a car according to one or more embodiments. Using software application 604, the user can select, by using one click, the full body of a car in a parking garage of a 3D point cloud. This example allows the selection of a gradient of color (RGB). With respect to the selection of a gradient of color, this example illustrates how the user can choose to reduce the size of the selection by lowering the neighbor to initial seed threshold, or on the contrary, allow the selection of many nuances of whites (a full gradient of colors), thus closing the gaps between light and dark areas. In FIG. 10, the region 650 is the full body of the car, excluding windows, tires, sunroof, etc. The region 650 is displayed with a different color, such as, for example, orange, while the remaining 3D data points in the 3D point cloud have other colors.

Figure 11:
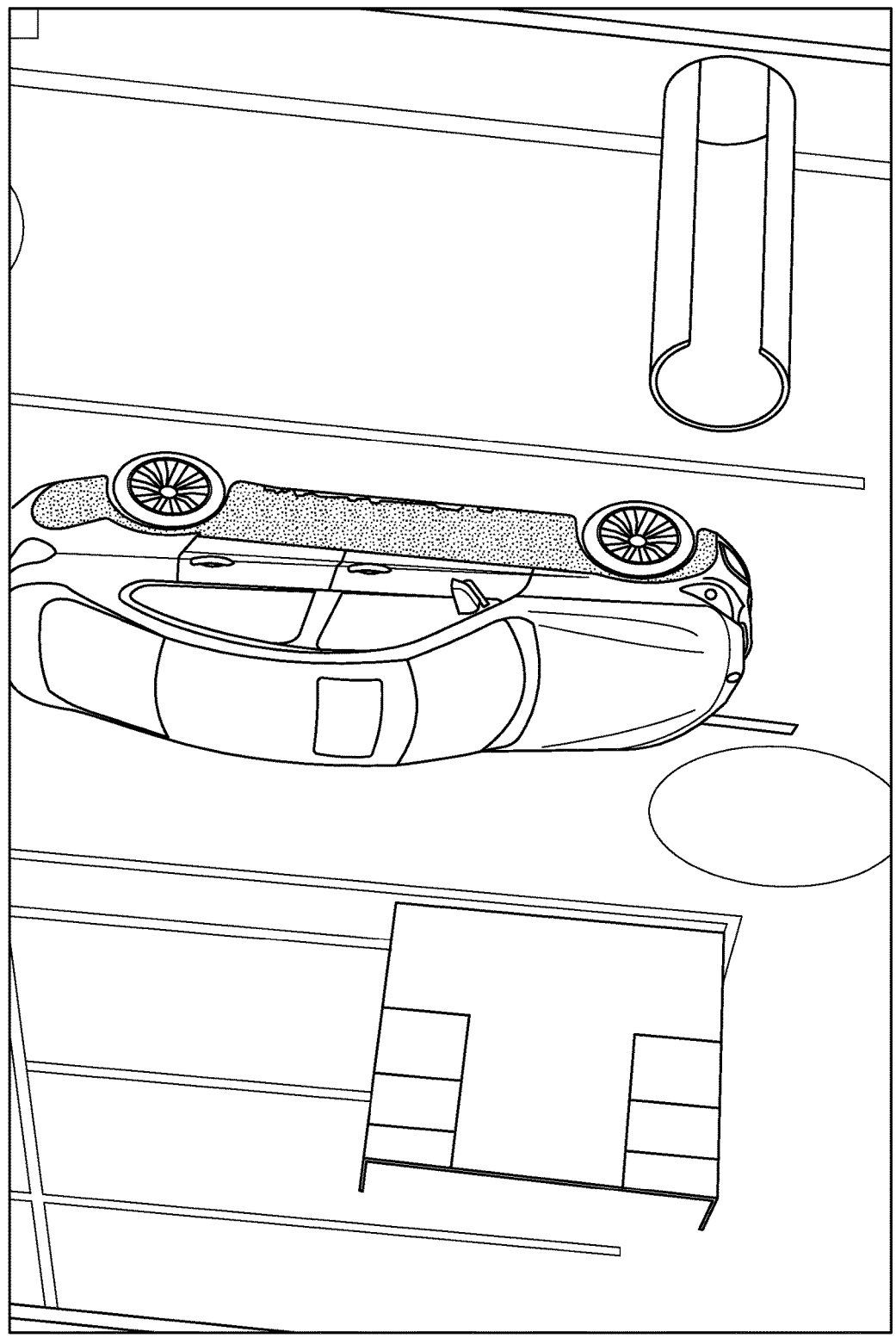
FIG. 11 is an example illustrating automatic selection of the side of a car according to one or more embodiments.

FIG. 11 is an example illustrating automatic selection of the side of the car according to one or more embodiments. Using software application 604, the user can select, by using one click, the side of the car in the parking garage of a 3D point cloud. Automatic selection of the side of the car can be accomplished because of combining the color (RGB) constraint with the smoothness constraint, while applying the initial seed angle threshold for a planar selection. Lowering the "initial seed angle threshold" to a small value will constrain the selection to points whose normal is very close to the initial seed, thus the selection will appear planar. The region 650 is the side of the car, excluding windows, tires, sunroof, etc. The region 650 is displayed with a different color, such as, for example, orange, while the remaining 3D data points in the 3D point cloud have other colors.

Figure 12:
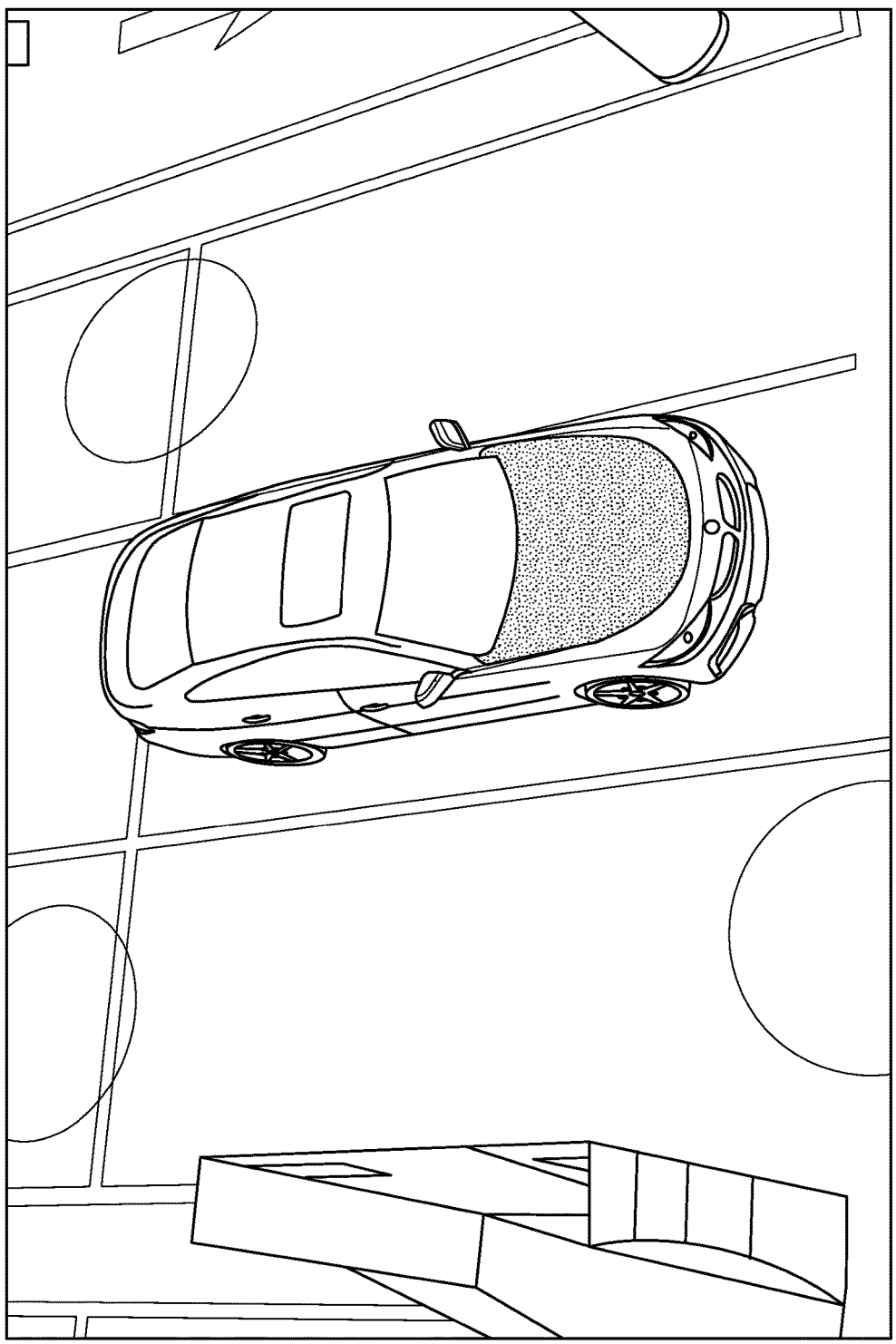
FIG. 12 is an example illustrating automatic selection of the hood of a car according to one or more embodiments.

FIG. 12 is an example illustrating automatic selection of the hood of the car according to one or more embodiments. Using software application 604, the user can select, by using one click, the hood of the car in the parking garage of a 3D point cloud. Automatic selection of the hood of the car can be accomplished because of the smoothness constraint with a fine-tuned angle value. The fine-tuning is for the "initial seed angle threshold" as noted above. Lowering the initial seed angle threshold will make the selection flatter. The curvature does not have to be changed from a nominal value to get those results (neither does the "neighbor to local seed normal angle threshold" need to be changed). Tuning the curvature threshold could, however, make such a selection possible on even finer details. In FIG. 12, the region 650 is the hood of the car. The region 650 is displayed with a different color, such as, for example, orange, while the remaining 3D data points in the 3D point cloud have other colors.

Figure 13:
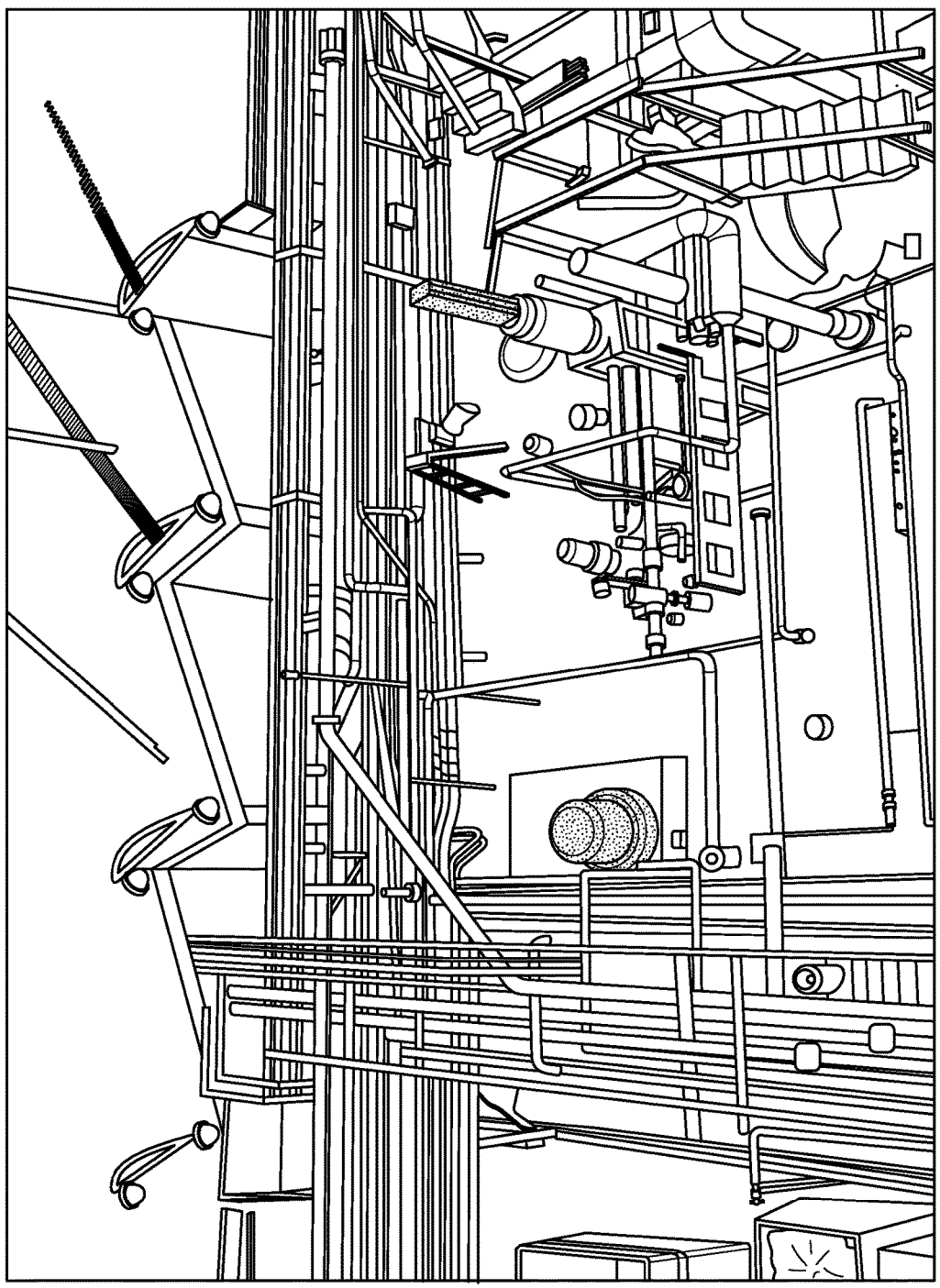
FIG. 13 is an example illustrating automatic selection in an industrial scene scan according to one or more embodiments.

FIG. 13 is an example of using automatic selection in an industrial scene scan according to one or more embodiments. Software application 604 can be utilized to perform automatic selection of pipes in a 3D point cloud of the industrial scene. The color (RGB) constraint and/or the smoothness constraint help to accomplish automatic selection of the pipes. The selected pipes can be displayed as regions 650 in the 3D point cloud with distinguishing colors such as, for example, orange. Additionally, as another example illustrated in FIG. 13, automatic selection of other objects with well-defined edges can be performed in the industrial scene scan. These other objects may be other industrial equipment and can be displayed as other regions 650 in the 3D point cloud with a distinguishing color, for example, orange.

Software application 604 can be used to select various objects in the industrial scene scan of FIG. 13, although their explicit selection is not shown so as not to obscure the figure. For example, automatic selection of software application 604 can automatically perform selection of ground areas, selection of shadows on the ground, etc.

Figure 14:
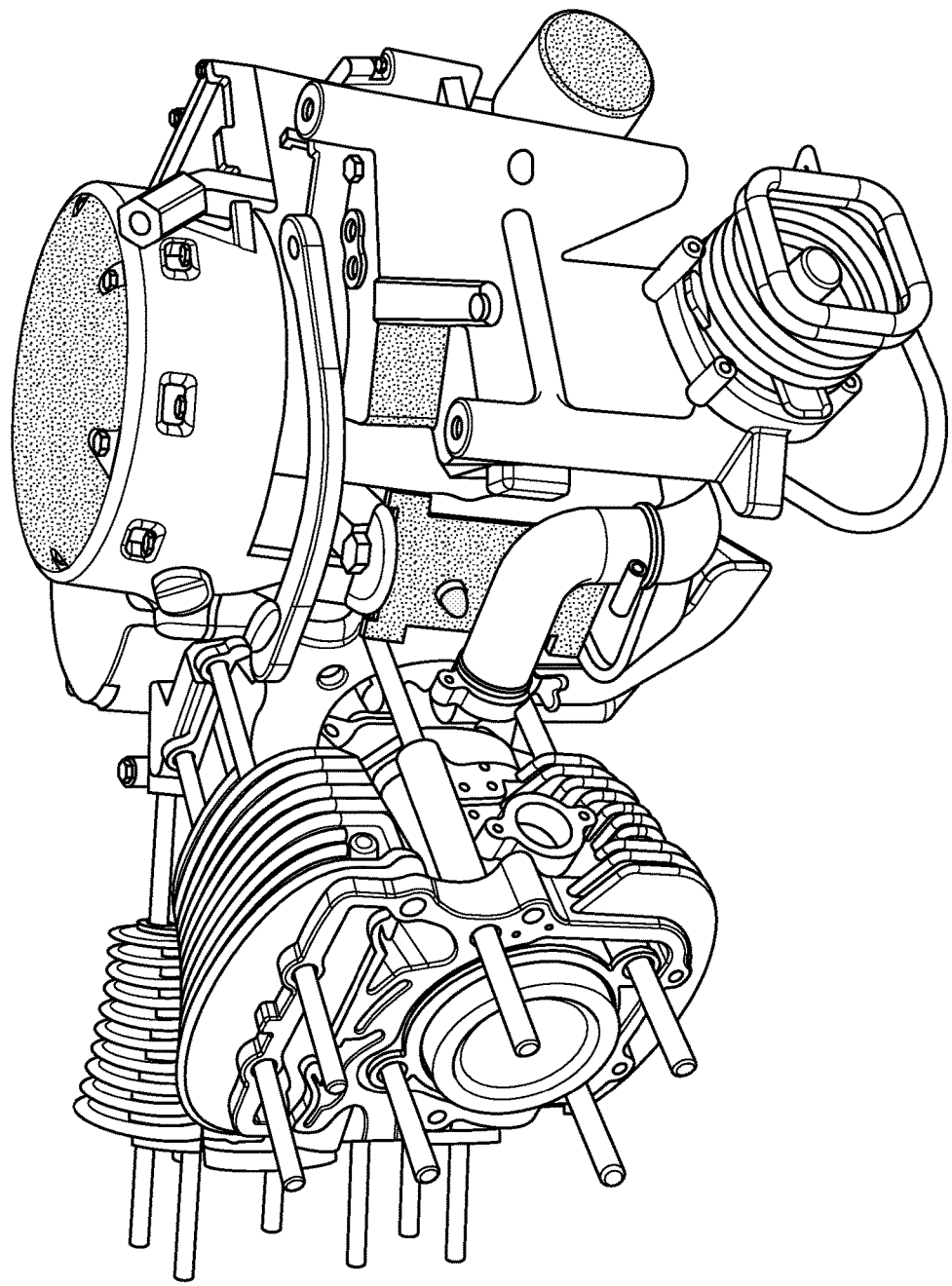
FIG. 14 is an example illustrating automatic selection for a detailed scan of a motor according to one or more embodiments.

FIG. 14 is an example of using automatic selection for a detailed scan of an engine according to one or more embodiments. Software application 604 can be utilized to perform automatic selection of separate objects of the engine. There may be cases where the angle threshold could possibly be difficult to tune and/or there are many objects that are smoothly connected, which could lead to leaks. Also, in this case, a well-tuned curvature threshold may not help prevent leaks between smoothly connected object. Such a case is where the threshold for comparison with the initial seed normal angle threshold (or a "planar selection ratio") is useful, because software application 604 allows for making small, controlled selections, and repeated user input (e.g., control plus mouse clicking) is fast enough to extend the selection where needed. In FIG. 14, the automatic selection can be utilized to automatically select the desired regions 650 of the 3D point cloud while preventing leaks between smoothly connected objects using the initial seed normal angle threshold.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A computer-implemented method for automatic selection of a region in a three-dimensional (3D) point cloud, the method comprising:

point cloud;
receiving an initial seed point of seed points for creating the region in the 3D performing a first process comprising:
  determining neighbor points for a given seed point of the seed points in the 3D point cloud; and
  for each of the neighbor points of the given seed point, performing a second process comprising:
    responsive to a color difference of a given neighbor point from the given seed point being less than a neighbor color distance threshold and responsive to an angle between a normal of the given neighbor point and a normal of the given seed point being less than a neighbor normal angle threshold, adding the given neighbor point to the region in the 3D point cloud and determining a curvature for the given neighbor point by calculating surface variance using covariance analysis; and
    responsive to the curvature at the given neighbor point being less than a curvature threshold, responsive to a color difference of the given neighbor point from the initial seed point being less than an initial seed color distance threshold, and responsive to an angle between a normal of the given neighbor point and a normal of the initial seed point being less than an initial seed normal angle threshold, adding the given neighbor point to the seed points in order to perform the first process for the given neighbor point having been added,
   wherein the color difference is determined using a Euclidian distance between two RGB vectors.

2. The computer-implemented method of claim 1, wherein the initial seed point is received from user input.

3. The computer-implemented method of claim 1, wherein each of the seed points is processed by the first and second processes, the region being complete in response to there being no unprocessed seed points.

4. The computer-implemented method of claim 1, wherein a number of the neighbor points available for the given seed point is predetermined in advance.

5. The computer-implemented method of claim 1, wherein the region comprises the initial seed point and other points determined by performing the first and second processes.

6. The computer-implemented method of claim 1, wherein display of the region is configured to be distinguished from display of other points in the 3D point cloud.

7. The computer-implemented method of claim 1, wherein the first and second processes occur prior to transforming the 3D point cloud into a 3D mesh.

8. A system for automatic selection of a region in a three-dimensional (3D) point cloud, the system comprising:
a memory having computer readable instructions; and
  one or more processors for executing the computer readable instructions, the computer readable instructions controlling the one or more processors to perform operations comprising:
    receiving an initial seed point of seed points for creating the region in the 3D point cloud;
    performing a first process comprising:
    determining neighbor points for a given seed point of the seed points in the 3D point cloud; and
    for each of the neighbor points of the given seed point, performing a second process comprising:
      responsive to a color difference of a given neighbor point from the given seed point being less than a neighbor color distance threshold and responsive to an angle between a normal of the given neighbor point and a normal of the given seed point being less than a neighbor normal angle threshold, adding the given neighbor point to the region in the 3D point cloud and determining a curvature for the given neighbor point by calculating surface variance using covariance analysis; and responsive to the curvature at the given neighbor point being less than a curvature threshold, responsive to a color difference of the given neighbor point from the initial seed point being less than an initial seed color distance threshold, and responsive to an angle between a normal of the given neighbor point and a normal of the initial seed point being less than an initial seed normal angle threshold, adding the given neighbor point to the seed points in order to perform the first process for the given neighbor point having been added, wherein the color difference is determined using a Euclidian distance between two RGB vectors.

9. The system of claim 8, wherein the initial seed point is received from user input.

10. The system of claim 8, wherein each of the seed points is processed by the first and second processes, the region being complete in response to there being no unprocessed seed points.

11. The system of claim 8, wherein a number of the neighbor points available for the given seed point is predetermined in advance.

12. The system of claim 8, wherein the region comprises the initial seed point and other points determined by performing the first and second processes.

13. The system of claim 8, wherein display of the region is configured to be distinguished from display of other points in the 3D point cloud.

14. The system of claim 8, wherein the first and second processes occur prior to transforming the 3D point cloud into a 3D mesh.

15. A computer program product comprising a non-transitory computer readable storage medium having program instructions embodied therewith for automatic selection of a region in a three-dimensional (3D) point cloud, the program instructions executable by one or more processors to cause the one or more processors to perform operations comprising:

receiving an initial seed point of seed points for creating the region in the 3D point cloud;

performing a first process comprising:

determining neighbor points for a given seed point of the seed points in the 3D point cloud; and for each of the neighbor points of the given seed point, performing a second process comprising:

responsive to a color difference of a given neighbor point from the given seed point being less than a neighbor color distance threshold and responsive to an angle between a normal of the given neighbor point and a normal of the given seed point being less than a neighbor normal angle threshold, adding the given neighbor point to the region in the 3D point cloud and determining a curvature for the given neighbor point by calculating surface variance using covariance analysis; and responsive to the curvature at the given neighbor point being less than a curvature threshold, responsive to a color difference of the given neighbor point from the initial seed point being less than an initial seed color distance threshold, and responsive to an angle between a normal of the given neighbor point and a normal of the initial seed point being less than an initial seed normal angle threshold, adding the given neighbor point to the seed points in order to perform the first process for the given neighbor point having been added, wherein the color difference is determined using a Euclidian distance between two RGB vectors.

16. The computer program product of claim 15, wherein the initial seed point is received from user input.

17. The computer program product of claim 15, wherein each of the seed points is processed by the first and second processes, the region being complete in response to there being no unprocessed seed points.

18. The computer program product of claim 15, wherein a number of the neighbor points available for the given seed point is predetermined in advance.

19. The computer program product of claim 15, wherein the region comprises the initial seed point and other points determined by performing the first and second processes.

20. The computer program product of claim 15, wherein display of the region is configured to be distinguished from display of other points in the 3D point cloud.

* * * * *